No. 875,581. PATENTED DEC. 31, 1907.
H. D. JAMES.
SYSTEM OF ELECTRIC MOTOR CONTROL.
APPLICATION FILED MAY 6, 1907.
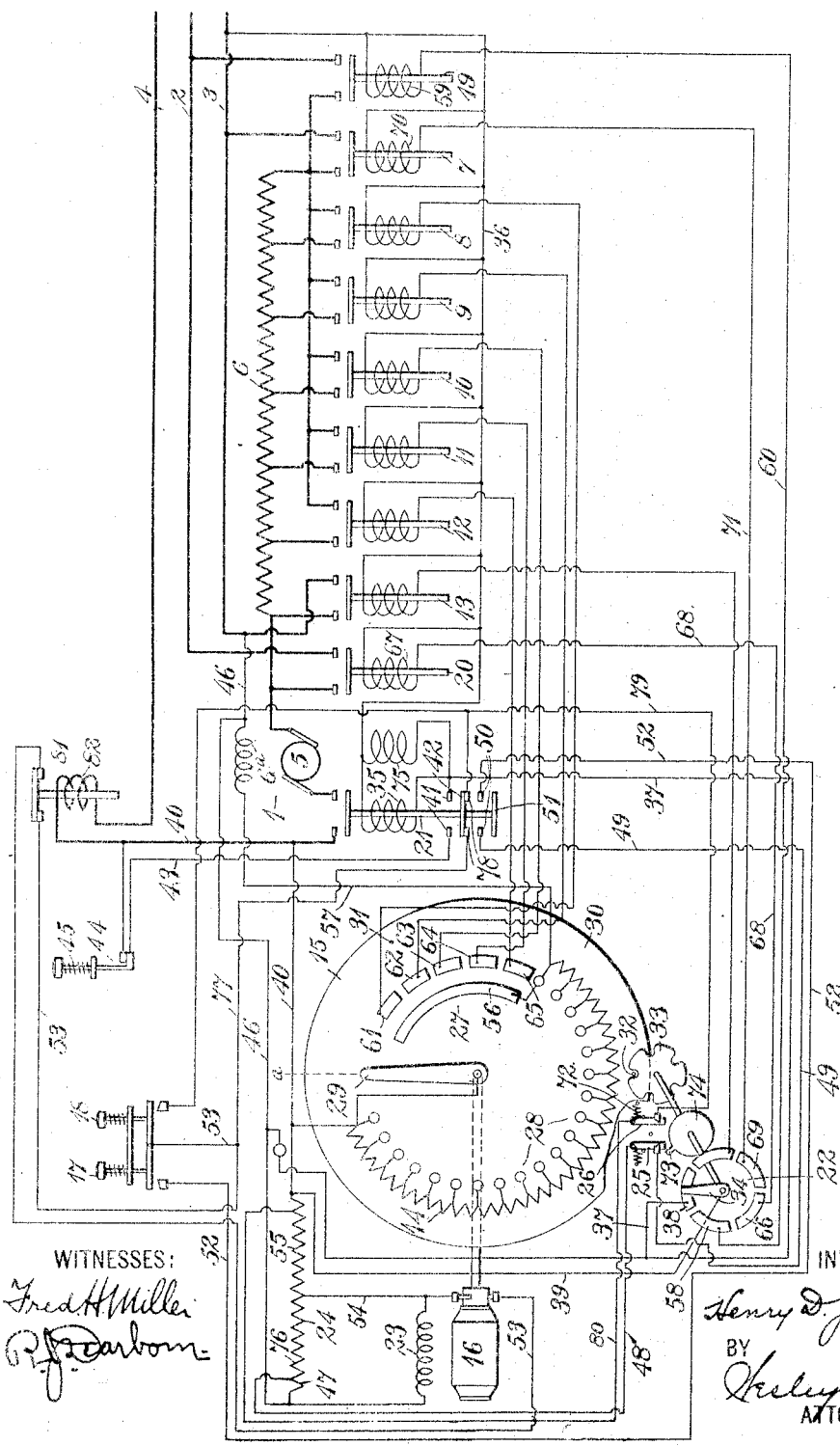
WITNESSES:
Fred H Miller
R J Dearborn
INVENTOR
Henry D. James
BY
Wesley G Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 875,551.

Specification of Letters Patent.

Patented Dec. 31, 1907.

Application filed May 6, 1907. Serial No. 372,136.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control, and has special reference to systems for the control of direct current motors which are supplied with energy from multi-voltage sources.

The object of my invention is to provide improved means for controlling the acceleration and speed regulation of electric motors.

When electric motors are employed for driving intricate machinery, such as a modern printing press, it is specially desirable to provide automatic means for effecting a close speed regulation which shall respond to a very simple switching device. Push button switches may be advantageously employed for this purpose and a number of groups of these devices may be stationed at various points about the machine for the convenience of an attendant, since it is often necessary to bring the machine to rest in a very short time to avoid injury.

The system of my present invention embodies a compound wound electric motor that is supplied with energy from a multi-voltage source and is provided with armature and field resistances for controlling its acceleration and speed regulation. A plurality of electrically operated switches are provided for governing the armature resistance and for changing the motor from the circuit of one voltage to the circuit of another voltage, and a motor-driven master controller governs the field resistance and the action of the control switches, the pilot motor which drives the master controller being controlled by push-button switches or other simple manually operated control devices.

The single figure of the accompanying drawing is a diagrammatic view of a system constructed and arranged in accordance with my invention.

An electric motor 1, to be employed in driving machinery for which a relatively close speed regulation is required, is supplied with electrical energy from positive line conductors 2 and 3 of unlike voltage, a circuit being completed through a single negative line conductor 4. The motor comprises an armature 5 and a shunt field magnet winding $6^a$. The circuit of the armature 5 is provided with a resistance 6 which may be varied by a series of control switches 7, 8, 9, 10, 11, 12 and 13 and the circuit of the shunt field magnet winding $6^a$ is provided with a resistance 14 which, together with the control switches, is governed by a master switch 15. The master switch 15 is governed by a pilot motor 16 which, in turn, is controlled by push-button switches 17 and 18. The specific line conductor to which the motor is connected is determined by switches 19, 20 and 21 that are governed by a change-over switch 22 which forms a part of the controller 15.

The pilot motor 16 may be of any suitable size and type and, as illustrated, is a commutator motor having a shunt field magnet winding 23 and is provided with a resistance 24 that determines the direction of rotation of the motor in conjunction with the push-button switches 17 and 18 and a pair of limit switches 25 and 26. The master controller 15 is equipped with two groups of stationary contact members 27 and 28 which are respectively connected to the actuating magnet windings of the control switches 8, 9, 10, 11 and 12 and to end and intermediate points in the field resistance 14. A movable contact arm 29 is adapted to engage the stationary contact members and is rotated, together with a disk or plate 30, by the motor 16. The rotatable disk 30 is provided with projecting pins 31 and 32 to engage notches in the periphery of a cam 33, which is adapted to drive a rotatable member 34 of the change-over switch 22.

The operation of, and the circuit connections for, the system are as follows: Assuming that the control switches are open and that the master controller 15 occupies its "off" position *a*, the motor 1 may be accelerated by closing the switch 17. The switch 21 is closed independently of the switch 17 when the master switch occupies its "off" position, since the circuit is completed through the actuating magnet winding 35 from positive line conductor 3 through conductor 36, magnet winding 35, conductor 37, stationary contact member 38 of the change-over switch 22, contact arm 34 and conductors 39 and 40 to negative line conductor 4.

As soon as the switch 21 is closed the circuit which is completed through its magnet winding 35 is made independent of the change-over switch 22 and is established from conductor 36 through the winding 35, stationary contact members 41 (which are bridged by movable contact member 42 when switch 21 is closed), conductor 43 and a push-button switch 44, which is normally closed by a spring 45, to the magnet line conductor 4. In this way, it is impossible to close the switch 21 unless the master controller occupies its "off" position, which indicates that the armature resistance short-circuiting switches are open and that the field resistance is excluded from the circuit, but, as soon as the switch 21 is closed, it may be held in this position independently of the change-over switch 22, the master controller 15 being then dependent upon the push-button switch 44, so that the connection from the motor to the negative line conductor may be interrupted at any time by opening the switch 44. With the switches 17 and 21 both closed, circuit is established from the line conductor 3 through conductor 46, a small section 47 of the resistance 24, conductor 48, limit switch 25, conductor 49, stationary contact members 50 (which are engaged by a bridging contact member 51 when the switch 21 is closed), conductor 52, switch 17, conductor 53, motor 16, conductor 54, section 55 of the resistance 24 and conductor 40, to the negative line conductor 4. Energy is thus supplied to the motor 16 which imparts a clockwise rotation to the movable contact arm 29 and to the disk 30 of the master controller 15. The controller arm 29 first moves into engagement with contact ring segment 56, establishes a circuit from the line conductor 3 through conductor 46, field magnet winding 6ª of the motor 1, conductor 57, ring segment 56, contact arm 29 and conductor 40 to the negative line conductor 4.

The circuit above traced shows that the field magnet winding of the motor is first connected directly across the line without resistance, so that a suitable field excitation is provided for starting the motor. The first movement of the contact arm 29 and the disk 30 causes a rotation of the contact arm 34, of the change-over switch 22, in a counter-clockwise direction by reason of the engagement of the pin projection 32 with a notch in the driving cam 33. This actuation of the driving cam establishes engagement of the contact arm 34 with a ring segment 58 and, in consequence of this engagement, a circuit is established from line conductor 3 through magnet winding 59 of the switch 19, conductor 60, ring segment 58, contact arm 34, conductors 39 and 40 to the negative line conductor 4. A motor circuit is established as soon as the switch 19 is closed, from the line conductor 2 (which is the lower-voltage source of energy), through the switch 19, resistance 6, motor armature 5, switch 21 and conductor 40 to the negative line conductor 4. The motor will thus be started from the low-voltage source, with the armature resistance 6 included in the circuit, and the field magnet winding 6ª will be excited to a maximum degree from the source of higher voltage. As the contact arm 29 continues to move in the same direction, it successively engages stationary contact members 61, 62, 63, 64 and 65 and, in consequence of this engagement, the switches 8, 9, 10, 11 and 12 are successively closed. These contact members are located relatively near together so that the contact arm, in passing from one member to the next adjacent member, is always in engagement with some one or more of the members. In this way, the resistance 6 is gradually short-circuited and the short-circuiting switches are permitted to open as soon as the next adjacent switch is closed.

Before the contact arm 29 is disengaged from the stationary contact member 65, the pin projection 31 from the disk 30 engages the notched cam 33 to give it another slight movement of rotation, sufficient to move the contact arm 34 into engagement with contact ring segment 66. By this engagement, circuit is establishd from line conductor 3 through conductor 36, magnet winding 67 of the switch 20, conductor 68, segment 66, contact arm 34, and conductors 39 and 40 to the negative line conductor 4. When the switch 20 is closed, a circuit is established directly from the line conductor 2 through this switch and the armature 5 of the motor 1 to the negative line conductor, the armature resistance being excluded from the circuit. These armature circuit connections are maintained while the arm 29 of the master controller continues in its rotation and passes over the group 28 of stationary contact members which are connected to the field resistance 14. The resistance of the field circuit is, in this way, gradually increased, thereby increasing the speed of the motor until a maximum is reached on the lower armature voltage.

The contact arm 29 and the disk 30 have now substantially completed one revolution and the projection 32 engages another notch in the periphery of the cam 33 so that the contact arm 34 of the change-over switch is moved out of engagement with the contact ring segment 66 and into engagement with a segment 69. A circuit is now completed from line conductor 3 through conductor 36, magnet winding 70 of the switch 7, conductor 71, contact segment 69, contact arm 34 and conductors 39 and 40 to the negative line conductor 4. The contact segments 66 and 69 are bridged temporarily by the contact arm 24, in passing from one to the other, so that the switch 7 is closed before the switch 20 is permitted to open, consequently, the resistance 6 is temporarily connected between the sources of unlike voltages 2 and 3, after which the resistance 6 is included in a circuit which is established from the line conductor 3 (a higher voltage source) through switch 7, resistance 6, the armature 5 of the motor 1, switch 21 and conductor 40 to the negative line conductor. The arm 29 has now again moved into engagement with the contact ring segment 56 so that the field magnet winding 6ª is again energized directly from the higher voltage source without resistance in the circuit, and, as hereinbefore described, the motor armature is also connected across the higher-voltage source with the resistance 6 included in circuit therewith. The second revolution of the contact arm 29 and the disk 30, as already described, effect the gradual short-circuiting of the armature resistance 6 and then the gradual weakening of the field magnet excitation until finally the armature 5 is energized from the higher-voltage source without resistance and the motor is operated at its highest speed.

If the switch 17 is held closed, the limit switch 26 will be automatically opened in opposition to a spring 72 by reason of the engagement of a projection 73 on a cam 74 with one extremity of the switch plate when the contact member 34 substantially completes one revolution, the disk 74 being operatively connected to a movable contact arm 34 and the cam 33. In this way, the pilot motor 16 which drives the master controller is brought to rest automatically and may be started only in the reverse direction. The motor may, of course, be operated at any intermediate speed or may be accelerated or retarded at the will of the operator by selectively closing the switches 17 and 18 and danger of injury to the master controller is avoided by the automatic limit switches 25 and 26. If it is desirable to bring the motor to rest at any time, the push-button switch 45 may be actuated to interrupt the circuit through the magnet winding 35, and a brake magnet winding 75, which is connected in multiple therewith, thereby interrupting the connection between the armature of the motor and the negative line conductor and applying the brakes (which may be arranged in a well known manner for application mechanically, while being normally released by the energizing of the magnet winding. When the switch 21 opens, a circuit is established from the line conductor 3 through conductor 46, a section 76 of the resistance 24, conductor 54, armature of the pilot motor 16, conductor 53, conductor 77, stationary contact members 78 (which are engaged by the bridging contact member 42 when the switch 21 is opened), conductor 79, limit switch 26 and conductors 80 and 40 to the negative line conductor 4. In this way, suitable circuit connections are established for the pilot motor 16, whereby the master controller 15 is automatically returned to its "off" position, it being impossible to re-accelerate the motor until this position is reached, since the switch 21 may not be again closed unless the contact arm 34 of the change-over switch 22 engages the stationary contact ring segment 38.

In order to automatically prevent the application of abnormally large currents to the motor armature on account of a relatively rapid increase in the applied electromotive force over the counter electromotive force induced in the armature, I provide a switching device 81, having a magnet winding 82, which is adapted to interrupt the pilot motor circuit established through conductor 53. The winding 82 is connected in the interrupted negative line conductor 4 and the switch is, therefore, responsive to a predetermined current flowing through the main motor circuit. By this means, the acceleration of the motor effected by the pilot motor 16 may be automatically suspended until the speed and the counter electromotive force of the motor 1 have sufficiently increased to reduce the line current.

The circuit connections of my improved system may, of course, be varied without departing from the spirit of my invention, and I desire that only such limitations be imposed as are indicated in the appended claims.

I claim as my invention:

1. In a control system, the combination with supply circuits of unlike voltage, an electric motor having armature and field magnet windings, armature and field resistances therefor, and independently-operated switches for controlling the armature resistances, of means for governing the control switches and the field resistance, said means comprising a rotatable contact arm, and a series of stationary contact members disposed in the arc of a circle and a driving motor for the contact arm.

2. In a control system, the combination with an electric motor having a field magnet winding and an armature winding, a field resistance and an armature resistance, of a plurality of independently-operated control switches for the armature resistance, a switching device for varying the field resistance and controlling the action of the independent switches, an electric driving motor therefor, and automatic and manually-operated means for controlling the driving motor.

3. In a control system, the combination with an electric motor, a supply circuit, a field resistance, an armature resistance, a plurality of independently-operated control switches for the armature resistance, and a circuit interrupter, of a switching device for controlling the field resistance and the operation of the control switches, an operating motor for the switching device, means for permitting the closure of the circuit interrupter only when the switching device occupies its "off" position, and means dependent upon the opening of the circuit interrupter for automatically returning the switching device to its "off" position.

4. In a control system, the combination with an electric motor, a supply circuit, a field resistance, an armature resistance, a plurality of independently-operated control switches for the armature resistance, and a circuit interrupter, of a switching device for controlling the field resistance and the operation of the control switches, means for permitting the closure of the circuit interrupter only when the switching device occupies its "off" position, and means, dependent upon the opening of the circuit interrupter for automatically returning the switching device to its "off" position.

5. In a control system, the combination with an electric motor, a supply circuit, a field resistance, an armature resistance, a plurality of independently-operated control switches for the armature resistance, and a circuit interrupter, of a switching device for controlling the field resistance and the operation of the control switches, and means, dependent upon the opening of the circuit interrupter, for automatically returning the switching device to a predetermined position.

6. In a control system, the combination with a supply circuit, an electric motor having field and armature windings, resistances therefor, a circuit interrupter, and a switching device for controlling the field resistance directly and the armature resistance indirectly, of means for permitting the closure of the circuit interrupter only when the switching device occupies a predetermined position, and means, dependent upon the opening of the interrupter for automatically returning the switching device to said position.

7. In a control system, the combination with supply circuits of unlike voltage, an electric motor, an electrically-operated line switch located in the common return circuit, a controller and a driving motor therefor, of means for permitting the closure of the line switch when the controller occupies a predetermined position, and means, dependent upon the opening of the line switch, for automatically moving the controller to said predetermined position.

8. In a control system, the combination with a supply circuit, an electric motor having armature and field magnet windings, resistances therefor, an electrically-operated line switch, a series of independently-operated control switches for the armature resistance, a switching device for varying the field resistance and controlling the independently-operated switches, and an electric driving motor for the switching device, of means for permitting the closure of the line switch only when the switching device occupies a predetermined position, and means, dependent upon the opening of the line switch, for automatically moving the controller to said predetermined position.

9. In a control system, the combination with supply circuits of unlike voltage, an electric motor having a shunt field magnet winding and an armature winding, and field and armature resistances, of independently-operated switches for controlling the supply circuit and resistance connections, a master switch for governing the control switches and the field resistance, and automatic means for suspending the operation of the master switch.

10. In a control system, the combination with supply circuits of unlike voltage, an electric motor having a shunt field magnet winding and an armature winding, and field and armature resistances, of independently-operated switches for controlling the supply circuit and resistance connections, and a switching device for varying the field resistance and controlling the action of the independent switches, an electric driving motor therefor, and manually-operated means for controlling the driving motor.

11. In a control system, the combination with supply circuits of unlike voltage, an electric motor having a shunt field magnet winding and an armature winding, and field and armature resistances, of independently-operated switches for controlling the supply circuit and resistance connections, and a switching device for varying the field resistance and controlling the action of the independent switches, an electric driving motor therefor and automatic and manually-operated means for controlling the driving motor.

12. In a control system, the combination with supply circuits of unlike voltage, an electric motor having a shunt field magnet winding and an armature winding, and field and armature resistances, and an auxiliary motor, of means driven thereby for automatically connecting the field magnet winding to the higher voltage source, the motor armature and the armature resistance to the low voltage source, short-circuiting the armature resistance, introducing resistance in the field circuit, short-circuiting the field resistance and connecting the armature and the armature resistance to the higher-voltage source, short-circuiting the armature resistance and re-introducing the field resistance, and means for automatically suspending the operation of the auxiliary motor.

13. In a control system, the combination with supply circuits of unlike voltage, and an electric motor having armature and field magnet windings, of means for varying the speed of the motor by connecting the motor armature successively to said supply circuits and energizing the field winding from one of the said circuits, and automatic means for suspending the operation of the speed-varying means.

14. In a control system, the combination with an electric motor having armature and field magnet windings, supply circuits of unlike voltage having a common return circuit, an automatically operated line switch in the return circuit, resistances for the armature and field magnet circuits, and independently-operated controller switches for the armature resistance, of a switching device for automatically connecting the motor armature and the armature resistance to the low-voltage source, short-circuiting the armature resistance, introducing resistance in the field circuit, short-circuiting the field resistance and connecting the armature and the armature resistance to the higher-voltage source, short-circuiting the armature resistance and re-introducing the field resistance, and means dependent upon the opening of the line switch for returning the switching device to a predetermined position.

15. In a control system, the combination with an electric motor having field magnet and armature windings, a field resistance and an armature resistance, of a plurality of independently-operated control switches for the armature resistance, a switching device for varying the field resistance and controlling the action of the independent switches, an electric driving motor therefor, and automatic means for suspending the operation of the driving motor at any point.

16. In a control system, the combination with an electric motor having field magnet and armature windings, a field resistance and an armature resistance, of a plurality of independently-operated control switches for the armature resistance, a switching device for varying the field resistance and controlling the action of the independent switches, an electric driving motor therefor, and automatic means, dependent upon a predetermined current in the main motor circuit, for suspending the operation of the driving motor.

17. In a control system, the combination with an electric motor having field magnet and armature windings, a field resistance and an armature resistance, of a plurality of independently-operated control switches for the armature resistance, a switching device for varying the field resistance and controlling the action of the independent switches, an electric driving motor therefor, limit switches for interrupting the pilot motor circuit at predetermined points in its travel in either direction of rotation, and automatic means dependent upon a predetermined current in the main motor circuit, for suspending the operation of the driving motor.

18. In a control system, the combination with supply circuits of unlike voltage, an electric motor having field magnet and armature windings, and field and armature resistances, of independently-operated switches for controlling the supply circuit and resistance connections, and a switching device for varying the field resistance and controlling the action of the independent switches, an electric driving motor therefor, and automatic means for suspending the operation of the driving motor at any point.

19. In a control system, the combination with supply circuits of unlike voltage, an electric motor having field magnet and armature windings, and field and armature resistances, of independently-operated switches for controlling the supply circuit and resistance connections, and a switching device for varying the field resistance and controlling the action of the independent switches, an electric driving motor therefor, and automatic means, dependent upon a predetermined current in the main motor circuit, for suspending the operation of the driving motor.

20. In a control system, the combination with supply circuits of unlike voltage, an electric motor having field magnet and armature windings, and field and armature resistances, of independently-operated switches for controlling the supply circuit and resistance connections, and a switching device for varying the field resistance and controlling the action of the independent switches, an electric driving motor therefor, manually-operated means for controlling the driving motor, and automatic means, dependent upon a predetermined current in the main circuit for suspending the operation of the motor.

21. In a control system, the combination with an electric motor having a field magnet and an armature winding, a field resistance and an armature resistance, of a plurality of independently-operated control switches for the armature resistance, a switching device for varying the field resistance and controlling the action of the independent switches, an electric driving motor therefor, a circuit interrupter in the driving motor circuit and an operating magnet for the interrupter that is connected in series with the main motor armature.

22. In control system, the combination with supply circuits of unlike voltage, an electric motor having field magnet and armature windings, and field and armature resistances, of independently-operated switches for controlling the supply circuit and resistance connections, and a switching device for varying the field resistance and controlling the action of the independent switches, an electric driving motor therefor, automatic and manually-operated means for controlling the driving motor, and means, dependent upon a predetermined current in the main motor circuit, for automatically suspending the operation of the driving motor.

In testimony whereof, I have hereunto subscribed my name this 29th day of April 1907.

HENRY D. JAMES.

Witnesses:
 Ross W. Copeland,
 Birney Hines.